United States Patent
Tully

(10) Patent No.: US 12,131,121 B2
(45) Date of Patent: Oct. 29, 2024

(54) DETECTING INFORMATION OPERATIONS CAMPAIGNS IN SOCIAL MEDIA WITH MACHINE LEARNING

(71) Applicant: Google LLC, Mountain View, CA (US)

(72) Inventor: Philip Tully, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/447,085

(22) Filed: Aug. 9, 2023

(65) Prior Publication Data
US 2023/0385548 A1    Nov. 30, 2023

Related U.S. Application Data

(62) Division of application No. 17/012,924, filed on Sep. 4, 2020, now Pat. No. 11,868,722.

(51) Int. Cl.
*G06F 40/284* (2020.01)
*G06F 40/30* (2020.01)

(52) U.S. Cl.
CPC ............ *G06F 40/284* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 2017/0206557 A1* | 7/2017 | Abrol | G06Q 50/01 |
| 2019/0014148 A1 | 1/2019 | Foster et al. | |
| 2020/0320616 A1* | 10/2020 | Edwards | G06N 20/10 |
| 2021/0312127 A1 | 10/2021 | Braghin et al. | |
| 2022/0070195 A1* | 3/2022 | Sern | G06N 3/045 |

* cited by examiner

*Primary Examiner* — Antim G Shah
(74) *Attorney, Agent, or Firm* — DORITY & MANNING P.A.

(57) ABSTRACT

A processor-implemented method for detecting an information operations campaign includes retrieving a first neural network language model including a natural language model trained on a first dataset. The first neural network language model is modified, via transfer learning and based on a second dataset, to produce a second neural network language model. Social media post data associated with a social media post is received, and features are extracted from the social media post data. The features are tokenized to produce at least one token including a value. A prediction score for the at least one token is generated using the trained neural network language model. If the prediction score exceeds a threshold value, a threat warning including a representation associated with at least one of the social media post or an account associated with the social media post is generated.

15 Claims, 5 Drawing Sheets

DETECTING INFORMATION OPERATIONS CAMPAIGNS IN SOCIAL MEDIA WITH MACHINE LEARNING

PRIORITY CLAIM

The present application is a divisional of U.S. application Ser. No. 17/012,924 having a filing date of Sep. 4, 2020. Applicant claims priority to and the benefit of each of such applications and incorporates all such applications herein by reference in its entirety.

TECHNICAL FIELD

This disclosure relates generally to the application of machine learning to information operations, and more specifically, to the use of Natural Language Processing (NLP) algorithms in generating predictions based on social media posts.

BACKGROUND

NLP algorithms use machine learning to analyze training data, in the form of text strings, and to learn rules that can subsequently be applied to new input data to make statistical predictions.

SUMMARY

The presently disclosed subject matter includes a method for detecting an information operations ("IO") campaign. In some embodiments, the method includes retrieving, via a processor, a first neural network language model. The first neural network language model is transformed (e.g., trained) based on a set of features to generate a prediction model. The method also includes receiving data associated with a social media post, classifying the social media post in response to a prediction generated by applying the prediction model to the data associated with the social media post, and issuing a report in response to the classification.

In some embodiments, the first neural network language model is generated using a neural network training procedure that is based, for example, on a first dataset that has been collected to generate a generalized language model. In some embodiments, the first dataset includes a collection of text samples retrieved from the Internet using, for example, a web scraper. In some embodiments, the first dataset is retrieved from one or more sources, and includes human-generated content, to assure high accuracy of the prediction model.

In some embodiments, the set of features used to transform the first neural network language model into the prediction model is associated with a second dataset associated with labeled content associated with social media post data. The labeled content can include, for example, social media post data associated with a classification label (e.g., "information operations," "benign," etc.). In some embodiments, a classification label also includes actor (e.g., individual, organization, nation state, etc.) information. In some embodiments, multiple second datasets are generated for use in the generation of multiple prediction models for a variety of platforms (e.g., social media platforms). For example, a different individual second dataset from the multiple second datasets may be associated with content originating on each of the Facebook® platform, the LinkedIn® platform, and the Twitter® platform. Each second dataset from the multiple second datasets may be used to transform the first neural network language model into a prediction model associated with the associated social media platform. The features from the set of features are tokenized to produce at least one token including a value. The value can include at least one of: an integer, a non-integer, a binary value, a hexadecimal value, an alphanumeric character (or any combination thereof).

Tokenizing can include, for example, mapping a string associated with the social media post to a value. A prediction score for the at least one token is generated using the prediction model. If the prediction score exceeds a threshold value, a threat warning including a representation associated with at least one of the social media post or an account associated with the social media post is generated, and a threat report is optionally generated, for presentation to a data analyst. The threat report includes the representation associated with the at least one of the social media post or the account associated with the social media post.

In some embodiments, a non-transitory processor-readable storage medium stores processor-executable instructions to receive social media post data associated with a social media post, and extract a set of features (e.g., including at least one string) from the social media post data. The medium also stores processor-executable instructions to tokenize the set of features, to produce at least one token, and send a representation of the at least one token to a neural network language model for generation of a prediction score for the at least one token. The neural network language model can be configured to generate the prediction score using, for example, a neural attention mechanism. The tokenizing can include mapping the at least one string to a value (a "tokenized value"). The tokenized value may be represented by, for example, an integer, a non-integer, a binary value, a hexadecimal value, or an alphanumeric character. The medium also stores processor-executable instructions to generate a threat warning including a representation associated with at least one of the social media post or an account associated with the social media post if the prediction score exceeds a threshold value, and to generate a threat report for presentation to a data analyst, the threat report including the representation associated with the at least one of the social media post or the account associated with the social media post if the prediction score exceeds a threshold value.

In some embodiments, a system for detecting an IO campaign includes a processor and a memory operably coupled to the processor. The memory stores instructions that, when executed by the processor, cause the processor to receive social media post data associated with a social media post, and generate a set of data values based on the social media post data. The set of data values can be suitable for use as inputs to a neural network language model. The memory also stores instructions that, when executed by the processor, cause the processor to send a representation of the set of data values to the neural network language model for generation of a prediction score for the at least one token. The neural network language model is configured to generate the prediction score, for example, using a neural attention mechanism. The memory also stores instructions that, when executed by the processor, cause the processor to generate a threat warning including a representation associated with at least one of the social media post or an account associated with the social media post if the prediction score exceeds a threshold value, and generate a threat report for presentation to a data analyst if the prediction score exceeds a threshold value. The threat report can include the representation associated with the at least one of the social media post or the account associated with the social media post.

DETAILED DESCRIPTION

Figure 1:
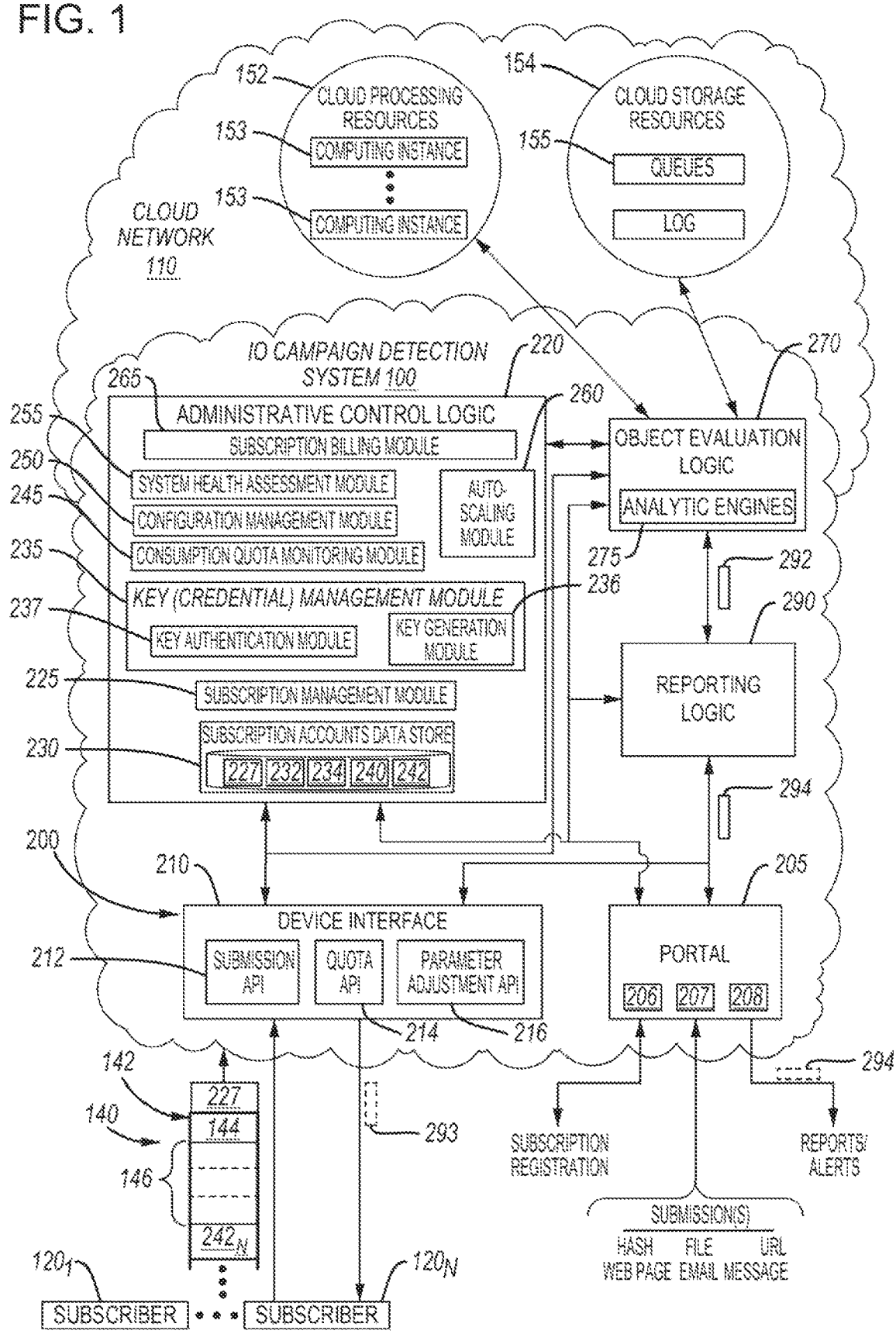
FIG. 1 is a diagram of a cloud portal system, according to some embodiments.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

Internet-based (e.g., social-media based) IO, such as disinformation (or other misinformation), are a growing challenge. IO activity is effective when it is indistinguishable from content that is not motivated by an IO campaign, from the point of view of an audience (e.g., a targeted audience) viewing the content. IO activity has flourished on social media, in part because IO campaigns can be conducted inexpensively, are relatively low risk, have immediate global reach, and can exploit the type of viral amplification incentivized by social media platforms. Using networks of coordinated accounts, social media-driven IO (e.g., associated with an IO "campaign") can disseminate and amplify content designed to promote specific political narratives, manipulate public opinion, evoke emotions or other reactions, prompt consumer behaviors, foment discord, or achieve strategic ideological or geopolitical objectives. The use of social media as a vehicle for IO activity is continually evolving. Effective detection of IO content in social media and/or on the Internet is desirable, so that IO campaigns can be identified, and the viewing public can be alerted and/or protected. An IO campaign can include one or more IO campaigns conducted for a particular purpose. Identified IO campaigns may be designated and labeled by analysts based on their target(s), purpose(s), method(s), and/or actor(s) (e.g., 2016 Russian (actor) US Election Disinformation (purpose) Campaign, etc.), and may be further categorized, for example, as influence campaigns, harassment campaigns, impersonation campaigns, or propaganda campaigns. In some implementations, a designation of an IO campaign does not conclusively determine the veracity of the content (e.g., statements, messages, and claims) of an IO campaign, however labels associated with an IO campaign may include determinations of the veracity of claims based on comparison(s) with a "ground truth"—i.e., an objective factual determination.

According to some embodiments set forth herein, a system for detecting an IO campaign automatically detects and classifies objects (such as social media posts—e.g., content from Facebook® postings, Twitter® tweets, LinkedIn® posts, etc.) as associated with M. As used herein, the phrase "information operations" (abbreviated herein as "IO") refers to the dissemination of disinformation and/or other misinformation using social media and other Internet-based or online platforms (e.g., paste sites, newspaper articles, magazine articles, forum posts, etc.).

The system operates by first (1) receiving an object (e.g., including content extracted from a social media post) for analysis, or (2) receiving content, such as a social media post, from which the object is extracted. In some embodiments, the content extracted from a social media post may include proposed (or "drafts" of) social media posts (e.g., content that has not yet been published to a social media platform). In some cases, the object may be extracted from other media, such as, for example, spoofed emails, news articles/reports, blogs, publicly-posted reviews and other publicly disseminated user-generated comments. The object is then tokenized using a tokenizer (e.g., software configured to generate a token based on the object). The tokenizing can include mapping a string of the object (where the string may include a single word, a portion of a word, or a string of characters extracted from the social media post) to a value, which can then be processed by a neural network. The tokenized object is provided to a token analyzer, which receives the object, retrieves (e.g., based on the object) a trained neural network language model for analysis (e.g., from a local model store or a remote model store), and processes the object using the trained neural network language model. A neural network language model is a collection of programmatic functions that can be executed by a computing device and applied to an object to determine a probability associated with a model. More specifically, a neural network language model is a statistical language model that may provide a probability distribution over a sequence of characters or words (e.g., multiple characters). The trained neural network language model generates a score based on the object (i.e., a probabilistic determination of an association between the object and a classification), and assigns a classification, which may include, for example, a label from a set of labels (e.g., "information operations," "benign," etc.) based on the score. The classification assigned to the object can depend, for example, on whether the score exceeds a predefined or specified threshold. In one embodiment, a separate classifier (e.g., implemented in software and/or hardware) assigns a label based on a score. The score can be based on contextual information associated with the object and/or other analyses of the object. As used herein, "contextual information" can include (but is not limited to) information associated with one or more: previous IO campaigns, target audiences, geographic locations, APTs, attack types (e.g., ransom attacks), historical social media posts, nation-states, and/or organizations. In some embodiments, the contextual information may be combined with a score to generate a classification by the classifier and/or a report generator. The contextual information can include information associated with, or intrinsic to, a particular social media content. Alternatively, or in addition, the contextual information can include information extrinsic to a particular social media text. Such extrinsic information can be referred to as "extrinsic intelligence," and can include, by way of example, meta-information associated with an object or an event, or other information associated with an IO campaign, which may be received from one or more compute device sources (e.g., external to a network of the system). Extrinsic intelligence relates to information (including meta-information) associated with a social media post and/or a social media post contributor, but does not include the content of a particular social media post.

The classification can be provided to a report generator (i.e., software/code configured to generate a report), which receives the classification, extracts, from the content, a set of characteristics (e.g., keywords, phrases, and/or narrative elements) associated with the classification, and combines the classification and characteristics into a threat report. In some embodiments additional contextual information may be incorporated into the generated threat report by the report generator, based on the extracted content. The additional contextual information incorporated into the threat report may be received from, for example, an intelligence system, a heuristics engine analyzing the extracted content, and/or a human analyst. The system can send the report to a remote compute device and/or to a local compute device (e.g., having a graphical user interface (GUI)), for presentation to an analyst (e.g., a cybersecurity analyst, an IO analyst, etc.). In some embodiments, the report, or contents thereof, can be automatically incorporated into a dashboard displayed to the analyst via the GUI, the dashboard presenting real-time data associated with incoming social media posts and their associated scores (or associated with a subset of the incoming social media posts having associated scores greater than a specified or predetermined threshold).

In some embodiments, a corpus of social media posts (e.g., including hundreds or thousands of social media posts, such as Twitter® tweets) is compiled for training the prediction model. The corpus of social media posts can be compiled automatically (e.g., via a processor, for example performing a web scraping function), and/or can be manually curated by one or more human users (e.g., analysts). The corpus of social media posts may include only posts that are associated with an IO campaign of interest. During a training phase, the corpus of social media posts is used to transform a pre-trained neural network language model, using transfer learning (e.g., the repurposing of the pre-trained neural network language model), to produce a customized neural network language model that is "specific to" (i.e., configured to detect social media posts associated with) the IO campaign of interest.

During a subsequent, "production" phase (for detection purposes), the transformed and customized neural network language model (i.e., the prediction model) can be applied to a received social media post to determine if the social media post is associated with the IO campaign of interest. For example, during operation, the customized neural network language model can detect, from a piece of text extracted from a selected social media post, a graded representation of a confidence score or a predicted probability of that selected social media post being related to the operations campaign of interest. The detection of the graded representation can be based, for example, on linguistic features of the selected social media post. The foregoing procedure leverages the pre-trained neural network language model and transfer learning to create the customized neural network language model, thereby facilitating the generation of new IO-specific neural network language models using less data (and, thus, fewer computational resources) than known methods, and resulting in improved efficiency and the ability to rapidly deploy new IO-specific neural network language models in response to real-time, near real-time, and/or contemporaneous IO threats as they emerge.

In some embodiments, the tokenizer processes a received object and generates a set of tokens associated with the object by splitting or "partitioning" the object content, for example at pre-defined locations (e.g., at spaces to create a set of words from a string), and associating each partition with a value (e.g., an integer, a non-integer, a binary value, a hexadecimal value, an alphanumeric character, or any combination thereof). For example, the tokenizer may receive an object containing the string "This is a sample string," which the tokenizer could split at each word break, thereafter associating each word from the multiple words of the string with a set of integers—e.g., [45, 2, 855, 94, 101]. As another example, the word "language" may be partitioned into "lang" and "uage." Each partition can then be mapped to an integer, for example using an integer table of a pre-trained neural network language model. The set of tokens generated by the tokenizer can be sent to a token analyzer for further processing/analysis.

In some embodiments, when a word is received at the tokenizer that the pre-trained neural network language model cannot recognize, and/or when a word is received at the tokenizer that cannot be partitioned into recognizable partitions, the word (or partition(s) thereof) is added to an integer table of the pre-trained neural network language model such that subsequent instances of the word will be recognized and successfully tokenized. The word (or partition(s) thereof) can be added to the integer table, for example, during a transfer learning procedure, as set forth herein.

In some embodiments, transfer learning includes the re-application of learned features and additional learning of a target-specific dataset from a first neural network language model to a subsequent (second) neural network language model. The target-specific dataset is a collection of social media posts where each social media post, of the collection, may be associated with a label. The label associated with each social media post may be generated automatically or by an analyst. The label associated with each social media post of the collection may indicate association with a specified IO campaign (e.g., #NODAPL, etc.) and/or a quality (e.g., benign, etc.). The target-specific dataset may be specific to a single/common social media platform (i.e., only representing social media posts from a single social media platform) or may include social media posts from a plurality of different social media platforms. The first neural network language model can be generated to model a linguistic environment. The first neural network language model may be a "general" model, in that it is not targeted to a specific task (i.e., generally applicable to several tasks), and may be configured for use with transfer learning. For example, the first neural network language model may be adapted to modeling English language posts on the Internet (e.g., a language model trained on a general dataset, such as OpenAI's GPT-2). A general dataset, for training the first neural network language model, may include a curated selection of content from the environment desired for representation in the neural network language model (e.g., content retrieved from the Internet that is determined to be in English).

In some embodiments, one or more neural network classification models are stored in a model store and retrieved by a token analyzer. The neural network models can be trained, for example, using a model generator using transfer learning techniques. The model generator may be configured to receive a pre-trained model and a target-specific dataset. The target-specific dataset can be labeled. Labeling includes associating one or more labels to one or more elements of the target-specific dataset. Examples of labels for target-specific datasets include, but are not limited to: participant campaign, participant campaign entity, source/originating actor, or target audience. A label may be determined, for an element of the dataset, automatically, for example according to one or more heuristics (e.g., all social media posts posted by a single social media account are considered part of an IO campaign) and/or manually (e.g., by information security analysts), to generate a new model according to a transfer learning method. In some embodiments, the label may be generated based, at least in part, on context associated with the element of the dataset (e.g., collected intelligence associated with the element, etc.), and/or determinations by an information analyst. The target-specific dataset provides domain-specific knowledge that may not be captured entirely by, or reflected in detail from, a more generalized pre-trained model generated without transfer learning.

In some embodiments, the target-specific dataset used by the model generator includes a more specific dataset, and further may be supplemented with a more specific dataset covering IO activity obtained via one or more recent IO campaigns (e.g., identified on a particular social media platform, such as Twitter®). In other embodiments, the more specific dataset may include additional samples beyond the dataset on which the pre-trained model was trained. The model generator may also include a feature extractor that receives the dataset and generates a set of features (e.g., as tokens) based on the content of the dataset. The generated models can be stored in the model store for subsequent retrieval (e.g., by a model analyzer). Some or all of the generated models may be executed in parallel with one another (i.e., such that execution of at least one of the generated models occurs, at least in part, overlapping in time with an execution of at least one other of the generated models), or in series, on a received social media post.

Systems and methods set forth herein can leverage transfer learning from neural networks that have been pre-trained on associated language modeling tasks, and fine-tuned (or "transformed") for use in predicting whether a given social media post is associated with an IO campaign. The fine-tuned/transformed neural network language models can be customized to target a specific task or theme related to IO activity (e.g., a particular election, a protest, a country or region, etc.). No known technique exists to perform such predictions using fine-tuned/modified (or "transformed") neural networks, in the manner set forth herein.

In some embodiments, an underlying "attention" capability of a pre-trained model is used to provide insights to users of a networked computer system (e.g., IO analysts and the like). When implemented as part of a neural network, a neural attention mechanism equips a neural network with the ability to focus on a subset of its inputs (e.g., features). For example, an attention procedure can include taking two input sentences, and converting them into a matrix in which the words of one of the sentences form the columns of the matrix, and the words of the other sentence form the rows of the matrix. The resulting matrix can then be used to detect matches between the sentences and/or to identify relevant context. Syntactic relationships between words or portions of words within a social media post and identified by the pre-trained model's attention mechanism can be valuable, e.g., from an analyst's point of view, because such syntactic relationships can be used to identify IO activity based, for example, on interrelated keywords and phrases.

Embodiments of the present disclosure can be practiced using a publicly-accessible system or using a private system (e.g., within a proprietary network). FIG. 1 is a diagram of a publicly-accessible cloud portal system, according to some embodiments. The publicly-accessible cloud portal system is monitored for metering and billing of customers of the system. The customers may include operators of social media platforms and/or the end-users of such platforms. As shown in FIG. 1, a cloud network 110 interacts with an IO campaign detection system 100. The cloud network 110 hosts cloud processing resources 152, including one or more compute devices ("computing instances," optionally including virtual machines) 153. The cloud network 110 also hosts cloud storage resources 154, including queues 155 and an optional usage log. The IO campaign detection system 100 includes interoperable (i.e., operably coupled, for example via wireless networked communication) computing functionality, represented by arrows in FIG. 1. The interoperable computing functionality includes, and is embodied in, administrative control logic 220, object evaluation logic 270, reporting logic 290, a device interface 210, and a portal 205. Each of the administrative control logic 220, the object evaluation logic 270, the reporting logic 290, the device interface 210, and the portal 205 can reside on a different associated compute device, or any subset of multiple such entities may share a common compute device.

The administrative control logic 220 is operably coupled to each of the object evaluation logic 270, the reporting logic 290, the device interface 210, and the portal 205, and includes a set of "modules" (a "module" defined herein as a discrete set of program instructions), including: a subscription billing module 265, a system health assessment module 255, a configuration management module 250, a consumption quota monitoring module 245, an auto-scaling module 260, a key (credential) management module 235, and a subscription management module 225. The key (credential) management module 235 includes a key authentication module 237 and a key generation module 236. The administrative control logic 220 also includes a subscription accounts data store 230 with a collection of interfaces 227, 232, 234, 240 and 242 (e.g., for subscriber-specific access to the administrative control logic 220). The object evaluation logic 270 includes one or more analytic engines 275, and is operably coupled (via operable coupling 292) to each of the reporting logic 290, the portal 205, and the device interface 210. The reporting logic 290 is operably coupled (via operable coupling 294) to the portal 205, the object evaluation logic 270, and the administrative control logic 220.

The device interface 210 includes a submission application programming interface (API) 212, a quota API 214, and a parameter adjustment API 216. The portal 205 includes an interface 206 configured to receive and send subscription registration information. The portal 205 also includes an interface 207 configured to receive submissions in the form of one or more of: a hash, a web page, a file, an email, a uniform resource locator (URL), or a message. The portal 205 also includes an interface 208 configured to send reports and/or alerts. A plurality of subscribers 1201 through 120N can communicate (e.g., through wired and/or wireless network communication via associated compute devices of the subscribers 1201 through 120N, such as operable coupling 293) with the IO campaign detection system 100 via the device interface 210. The subscribers 1201 through 120N can submit requests (e.g., request 144 located in queue position 142) to the IO campaign detection system 100 (e.g., via the submission API 212), and in turn, can receive reports and/or alerts from the IO campaign detection system 100. Subscriber requests may be queued (in a queue 140 including queue positions 146) for submission prior to reaching the IO campaign detection system 100.

Figure 2:
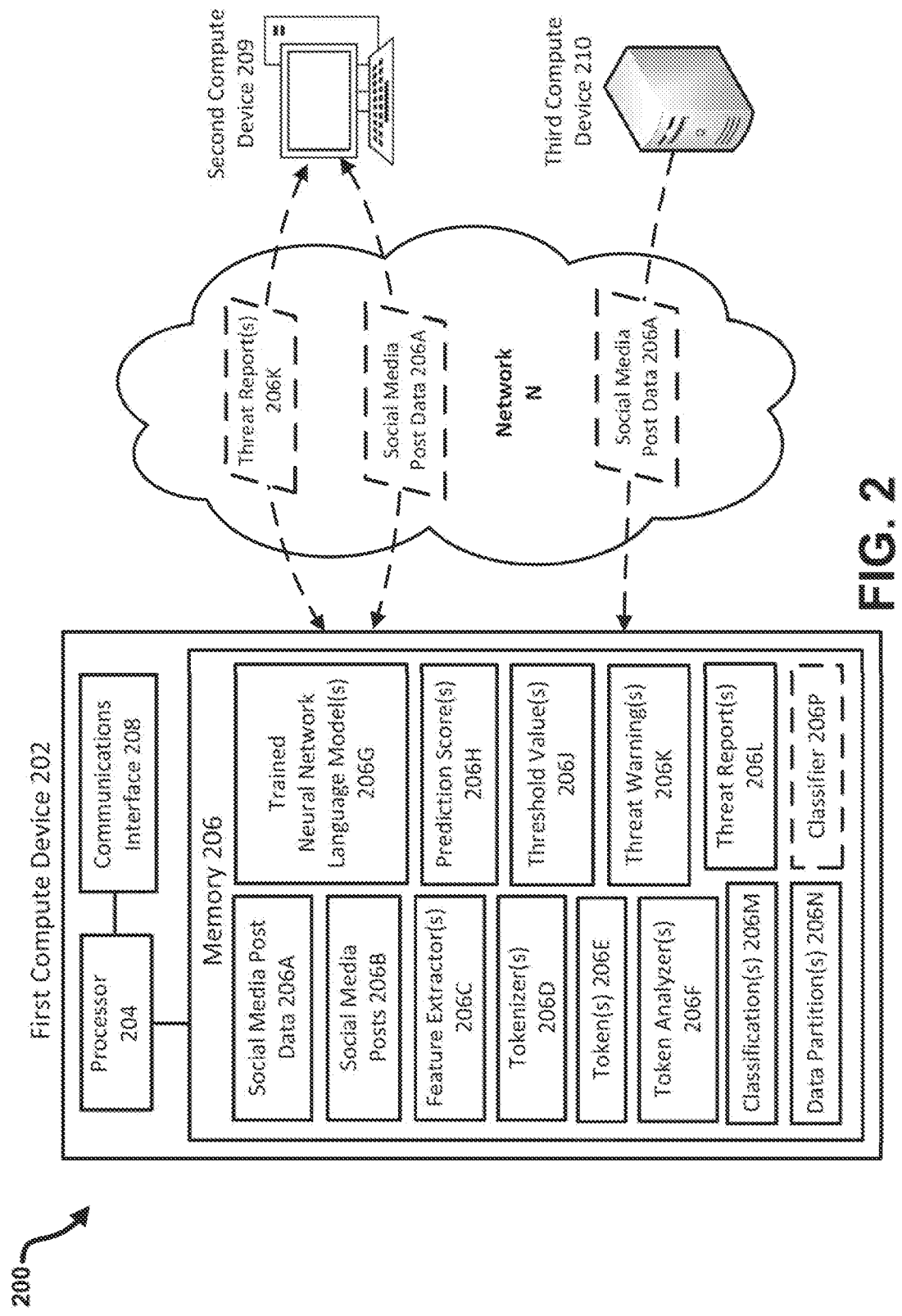
FIG. 2 is a block diagram showing a system for detecting an information operations campaign, according to an embodiment.

FIG. 2 is a block diagram showing a system for detecting an IO campaign, according to an embodiment. As shown in FIG. 2, the system 200 includes a first compute device 202 that can communicate with a second compute device 209 and a third device 210, via a communications network "N" (which may be a wired network(s) and/or a wired network(s)). The first compute device 202 can be used, for example, as the portal 205 of FIG. 1. The first compute device 202 includes a processor 204 in operable communication with a memory 206 and a communications interface 208 (e.g., an antenna or a network interface controller (NIC)). The memory 206 stores data as well as processor-executable instructions (code) that, when executed by the processor 204, cause the processor 204 to perform a series of steps. More specifically, the memory 206 stores one or more of: social media post data 206A, social media posts 206B, feature extractor code ("feature extractor(s)") 206C, one or more tokenizers 206D, one or more tokens 206E, one or more token analyzers 206F, one or more trained neural network language models 206G, one or more prediction scores 206G, one or more threshold values 206J, one or more threat warnings 206K, one or more threat reports 206L, one or more classifications 206M (e.g., including labels), one or more data partitions 206N, and an optional classifier 206P. The one or more prediction scores 206H can be used to predict whether a given social media post 206B is associated with an IO campaign. The classifier 206P can be implemented in software, and configured to assign labels to the tokens 206E, e.g., based on the prediction scores 206H, and the labels are stored as classifications 206M. In some implementations, one or more of the trained neural network language models 206G is generated by the first compute device 202 by training one or more neural network language models, for example using training data. The social media post data 206A can be locally generated (i.e., at the first compute device 202 or a local device connected thereto) and/or can be received at the first compute device 202, via the communications interface 208 and the network N from one or both of the second compute device 208 (associated, for example, with a user/customer of the system 200) and the third compute device 210 (associated, for example, with a third-party source of social media post data and/or a social media platform). The third-party source could be, for example, a social media platform host server (e.g., for Twitter®, Facebook®, Instagram®, LinkedIn® etc.), other Internet-based or online platforms (e.g., paste sites, newspaper articles, magazine articles, forum posts), a user of a social media platform, an aggregator of social media data, etc. The classification, generated by the classifier 206P, may be displayed to an analyst (e.g., via a GUI) as a recommendation to provide to the ultimate audience of a social media post. In some embodiments, the classification generated by the classifier 206P is provided to a government or an investigative entity that is attempting to detect, monitor, prevent, and/or attribute IO campaigns. The classification may indicate a threat such as IO activity. IO activity may include a disinformation attack, where the content of a social media post is crafted to mislead an audience.

In some embodiments, a given trained neural network language model 206G can be associated with a particular IO campaign, for example by storing an association between the IO campaign and the trained neural network language model 206G in memory 206.

Alternatively, or in addition, a given trained neural network language model 206G can be associated with a particular nation state's "advanced persistent threat" (APT), for example by storing an association between the APT and the trained neural network language model 206G in memory 206.

In some embodiments, the memory 206 stores instructions that, when executed by the processor 204, cause the processor 204 to receive the social media post data 206A, associated with a social media post 206B, and generate a set of data values based on the social media post data 206A. Each data value can be, for example, a token from the tokens 206E, generated by the tokenizer(s) 206D. The set of data values can be suitable for use as inputs to a trained neural network language model 206G. The memory 206 also stores instructions that, when executed by the processor 204, cause the processor 204 to send a representation of the set of data values to the trained neural network language model 206G for generation of a prediction score 206H, for the set of data values. The trained neural network language model 206G is configured to generate the prediction score 206H, for example, using a neural attention mechanism. The memory 206 also stores instructions that, when executed by the processor 204, cause the processor 204 to generate a threat warning 206K including a representation associated with at least one of the social media post 206B (e.g., a classification determination including meta-information associated with the social media post) or an account associated with the social media post 206B if the prediction score 206H exceeds a threshold value 206J, and generate a threat report 206L for presentation to a data analyst if the prediction score 206G exceeds the threshold value 206J. The generation of the threat report 206L can be based, for example, on syntactic relationships between words or portions of words within the social media post that are identified by the trained neural network language model 206G. The threat report 206L can include the representation associated with the at least one of the social media post 206B or the account associated with the social media post 206B. In some instances, one or more of the threat reports 206L generated by the first compute device 202 can be sent, via the communications interface 208 and the network N, to the second compute device 208. The processor optionally causes the threat warning to be sent to one or more remote compute devices and/or sends a signal to cause display of the threat warning via a GUI operably coupled to the processor and/or via a GUI of a remote compute device.

In some embodiments, the memory 206 also stores instructions that, when executed by the processor 204, cause the processor 204 to receive, from the trained neural network language model 206G, a classification 206M for the social media post 206B, and include a representation of the classification 206M in the threat report 206L. The classification 206M can have a value, for example, within a range of 0 to 1 (e.g., with '0' representing a probability of no threat, and with '1' representing a probability of a certain threat). Alternatively, or in addition, the classification 206M can be based on a multidimensional representation including a value of a maliciousness metric and a value of an authenticity metric.

In some embodiments, the memory 206 also stores instructions that, when executed by the processor 204, cause the processor 204 to receive, from the trained neural network language model 206H, a classification 206N for the social media post 206B, and include, via the processor 204, a representation of the classification 206M in the threat report 206L. The classification 206M can include an identification of an IO campaign.

In some embodiments, the memory 206 also stores instructions that, when executed by the processor 204, cause the processor 204 to partition the social media post data 206A into a set of data partitions 206N based on pre-defined locations within the social media post data 206A, and associate each data partition 206N from the set of data partitions 206N with a value, such as an integer, a non-integer, a binary value, a hexadecimal value, an alphanumeric character, or any combination thereof, to produce the set of data values. The pre-defined locations can be social media platform-specific. For example, a set of one or more pre-defined locations for a Twitter® post may be different from a set of one or more pre-defined locations for a Facebook® post. The pre-defined locations can include, for example, a location within the social media post data 206A that demarcates a transition between header information (e.g., comprising a header portion of a social media post) and body information (e.g., comprising a body portion of a social media post). Alternatively or in addition, the memory 206 can store instructions that, when executed by the processor 204, cause the processor 204 to parse and/or subdivide body information of the social media post data 206A, for example based on detected breaks between words, punctuation, etc. The integer values can be associated with the data partitions according to an integer table or other mapping tool. The integer table can be part of a pre-trained neural network language model or a trained IO-specific neural network language model, as set forth herein.

In some embodiments, the memory 206 also stores instructions that, when executed by the processor 204, cause the processor 204 to determine a scope of an IO campaign based on at least one of the social media post data 206A or the prediction score 206H. For example, in some embodiments, the instructions cause execution of an aspect (i.e., a subset of code) of the classifier 206P to determine the scope of the IO campaign. The scope of an IO campaign can be determined (i.e., calculated, predicted, estimated, etc.) by compiling social media post data 206A for multiple social media posts, over a predetermined or indefinite period of time, and detecting a high prevalence of a common associated IO campaign among the multiple social media posts, as compared with at least one other IO campaign. Alternatively or in addition, the scope of an IO campaign can be determined (i.e., calculated, predicted, estimated, etc.) based on one or more of: social media post volume, frequency or rate of positive detection events over a predetermined time period, number of unique actors (i.e., accounts authoring the social media posts), number of followers of the unique actors, measure(s) of virality of the social media posts, and/or weighting of social media posts based on the number(s) of followers and/or the verification status of the social media account(s) (e.g., tweets from "blue checkmark verified" Twitter® accounts may be assigned a higher weight, as compared with posts made by non-verified accounts).

Figure 3:
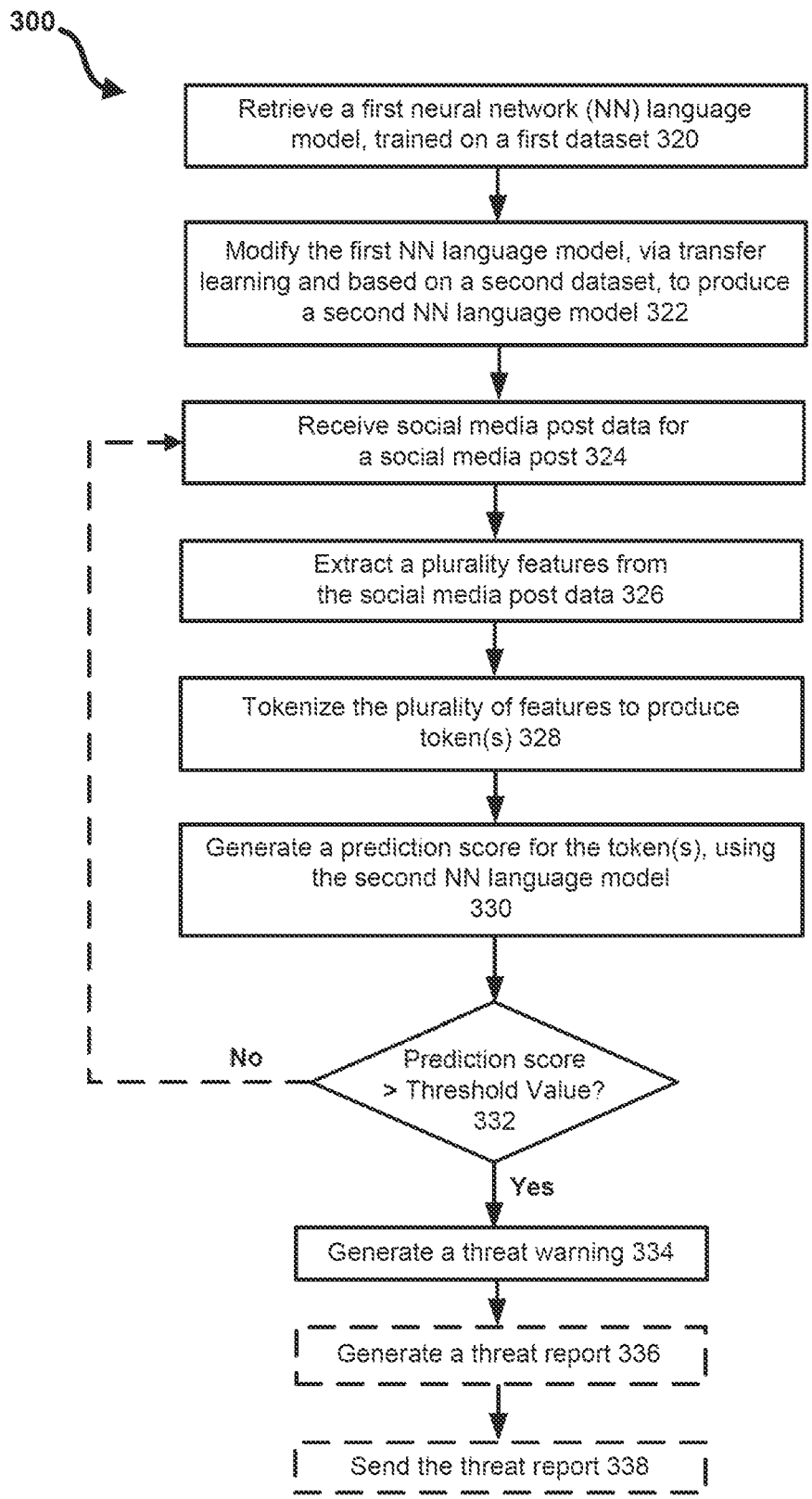
FIG. 3 is a flow diagram showing a method for detecting an information operations campaign, according to an embodiment.

FIG. 3 is a flow diagram showing a method for detecting an IO campaign, according to an embodiment. The method 300 of FIG. 3 can be performed, for example, using the cloud portal system of FIG. 1 or the system 200 of FIG. 2. As shown in FIG. 3, the method 300 includes retrieving, at 320 and via a processor (e.g., of the cybersecurity portal 205 of FIG. 1 or the first compute device 202 of FIG. 2), a first neural network language model that has been trained on a first dataset (e.g., a general dataset). At 322, the first neural network language model is modified, via transfer learning and based on a second dataset (e.g., a target-specific dataset), to produce a second neural network language model. The method 300 also includes receiving, at 324 and via the processor, social media post data associated with a social media post. The social media post data can be supplied, for example, to a portal (e.g., portal 205 of FIG. 1), via an API (e.g., submission API 212 of FIG. 1). At 326, a set of features (e.g., including at least one string, where a string is a sequence of characters, such as American Standard Code for Information Interchange ("ASCII") or Extended Binary Coded Decimal Interchange Code ("EBCDIC") characters) is extracted from the social media post data. The features from the set of features are tokenized, at 328, to produce at least one token including a value. The value can include at least one of: an integer, a non-integer, a binary value, a hexadecimal value, an alphanumeric character (or any combination thereof). The tokenizing can include, for example, mapping the at least one string to the value. A prediction score for the at least one token is generated, at 330, using the second neural network language model. At 332, a determination is made as to whether the prediction score exceeds the threshold value. If the prediction score exceeds a threshold value at 330, a threat warning (or alert) including a representation associated with at least one of the social media post or an account associated with the social media post is generated, at 334, and a threat report is optionally generated, at 336, e.g., for presentation to a data analyst. The threat report can be displayed via a GUI of a local compute device, and is optionally sent (e.g., if not displayed via a GUI of a local compute device), at 338, e.g., to a remote compute device (e.g., for presentation via a GUI thereof). The threat report can include the representation associated with the at least one of the social media post or the account associated with the social media post (e.g., to "flag" the at least one of the social media post or the account associated with the social media post). If the prediction score does not exceed the threshold value at 332, the process optionally loops back to step 324, at which point additional social media post data is received, or the processor stands by to receive additional social media post data. In the context of method 300 of FIG. 3, social media post data may be analyzed in blocks/chunks/partitions. For example, in some implementations, each social media post is broken up into chunks/partitioned, and each chunk/partition can be independently analyzed (with associated predictions generated). The resulting predictions can then collectively be analyzed (e.g., by comparing a maximum value from the predictions with a predefined threshold value, and concluding that the social media post is part of an IO campaign if the maximum value is greater than the predefined threshold value).

The method 300 optionally includes causing the threat warning to be sent to one or more remote compute devices and/or sending a signal to cause display of the threat warning via a GUI operably coupled to the processor and/or via a GUI of a remote compute device. For example, the threat warning may be displayed to a user (e.g., of a social media platform) via a textual warning, a warning banner, and/or a modal display restricting interaction with the social media post without acknowledging the threat warning. Similarly, a threat analyst may receive the threat warning via a developer console and/or a separate signaling (i.e., notification) system.

In some implementations, social media posts are analyzed and scored on an individual, post-by-post basis (e.g., for social media posts having a size less than a predetermined threshold/limit, e.g., 80, 140, or 280 characters). For example, tweets may be analyzed and scored on an individual, tweet-by-tweet basis. Between 60 and 100 associated tokens may be generated for each tweet. When a social media post is longer than a predetermined threshold/limit, that social media post may be truncated, with a portion thereof discarded or not analyzed. Alternatively, a social media post that is longer than a predetermined threshold/limit may be partitioned into sub-posts that are separately tokenized and analyzed/scored. When a social media post is slightly or significantly shorter than a predetermined threshold/limit, that social media post may be tokenized, and an additional step of appending zeros to the value(s) (e.g., to integer value(s)) may be performed (i.e., "padding with zeros").

In some embodiments, the generating the prediction score at 330 is based on at least one of: contextual information associated with the social media post, or extrinsic intelligence associated with the social media post. Alternatively, or in addition, the threat report (generated at 336 and sent at 338) can include a representation of at least one of: contextual information associated with the social media post, or extrinsic intelligence associated with the social media post. For example, in some embodiments, a threat report is provided to an analyst based on an association of a social media post contributor with an APT actor, the association based at least in part on extrinsic intelligence. The extrinsic intelligence, e.g., an association of a social media post contributor with an APT group, may be provided as an aspect of the threat report delivered to the analyst as information leading to the determination.

In some embodiments, the method 300 also includes assigning, via the processor, a classification to the social media post using the trained neural network language model and including a representation of the classification in the threat report. The classification can be based on a multidimensional representation including a value of a threat (e.g., maliciousness) metric and a value of an authenticity metric. A maliciousness metric may be based on an association of the social media post, by the processor, with known IO campaigns. For example, a social media post contributor may be associated with IO campaigns based on a labeling system (e.g., an automated system based on sentiment analysis, or a manual, analyst based classification system), thereby leading to subsequent social media posts being associated with a likelihood of maliciousness. Similarly, an authenticity metric may be determined by an association of labeled social media posts (e.g., authentic, inauthentic, etc.) by a social media post contributor. The classification can have a value, for example, within a range of 0 to 1.

In some embodiments, the tokenizing the set of features from the social media post data includes partitioning the social media post data into a set of data partitions based on pre-defined locations within the social media post data, and associating each data partition from the set of data partitions with a value. The generating of the prediction score for the at least one token can include sending the values to the trained neural network language model for execution according to the programmatic functions of the model. A prediction may be generated for a plurality of tokens individually and/or as a mathematical combination of the predictions associated with each token.

In some embodiments, the first neural network language model, retrieved at 320, was pre-trained (prior to the transfer learning) based on generic text and/or to perform a different task (which differs from the IO campaign detection task), such as a generative task, e.g., prediction of a next word or word fragment. For example, in an embodiment, the first neural network language model may include a model trained on a corpus of human generated content (e.g., a library of digitized books). In other embodiments the first neural network language model may include a model configured to detect, for example, topics in social media. The models described in the preceding examples of the first neural network model, may be configured, according to the transfer learning technique described herein, to develop a model for IO campaign detection. In some embodiments, the trained neural network language model is accessed via, or retrieved from, a model store, instead of being trained at 322. For example, in some embodiments, the transfer learning includes removing/stripping at least one layer (e.g., the layer(s) responsible for performing the generative task) from the multiple layers of the first neural network language model to produce a modified version of the first neural network language model. The modified version of the first neural network language model is then trained based on the second dataset (e.g., a target-specific dataset), to produce the second neural network language model (with one or more added/replacement layers, also referred to as "dense" layers or "linear" layers, replacing the at least one layer that was previously removed/stripped) adapted to a problem domain distinct from the problem domain of the first neural network language model. The one or more replacement layers can include a plurality of units representing neurons, and a plurality of weights projected to the neurons. The weights can be synaptic weights, representing a strength or amplitude of a connection between two nodes of the neural network. The second type of problem can be detecting IO activity within a social media post or other online/web-based content, classifying social media posts based on their predicted likelihood of being part of an IO campaign, etc. The second neural network language model can be configured, for example, to predict the likelihood of a social media post being part of an IO campaign based on one or more of the following features: social media post formatting, language features (e.g., phrasing nuances, syntactical features, grammatical features, punctuation features, colloquialisms, dialects, grammatical tone, etc.).

In some embodiments, the method 300 also includes generating a set of prediction scores for the at least one token, using a set of neural network language models including the trained neural network language model, with the set of prediction scores including the prediction score. Based on the set of prediction scores, an IO campaign associated with the social media post is identified.

In some embodiments, a pre-processing step precedes the method 300. During the pre-processing step, social media posts that are "known" (e.g., having a confidence level exceeding a predefined threshold level) to be part of an IO campaign or to include IO content are segregated from a larger corpus of social media posts, such that only social media posts not already known to be part of an IO campaign or to include IO content are analyzed by a neural network classifier.

Figure 4:
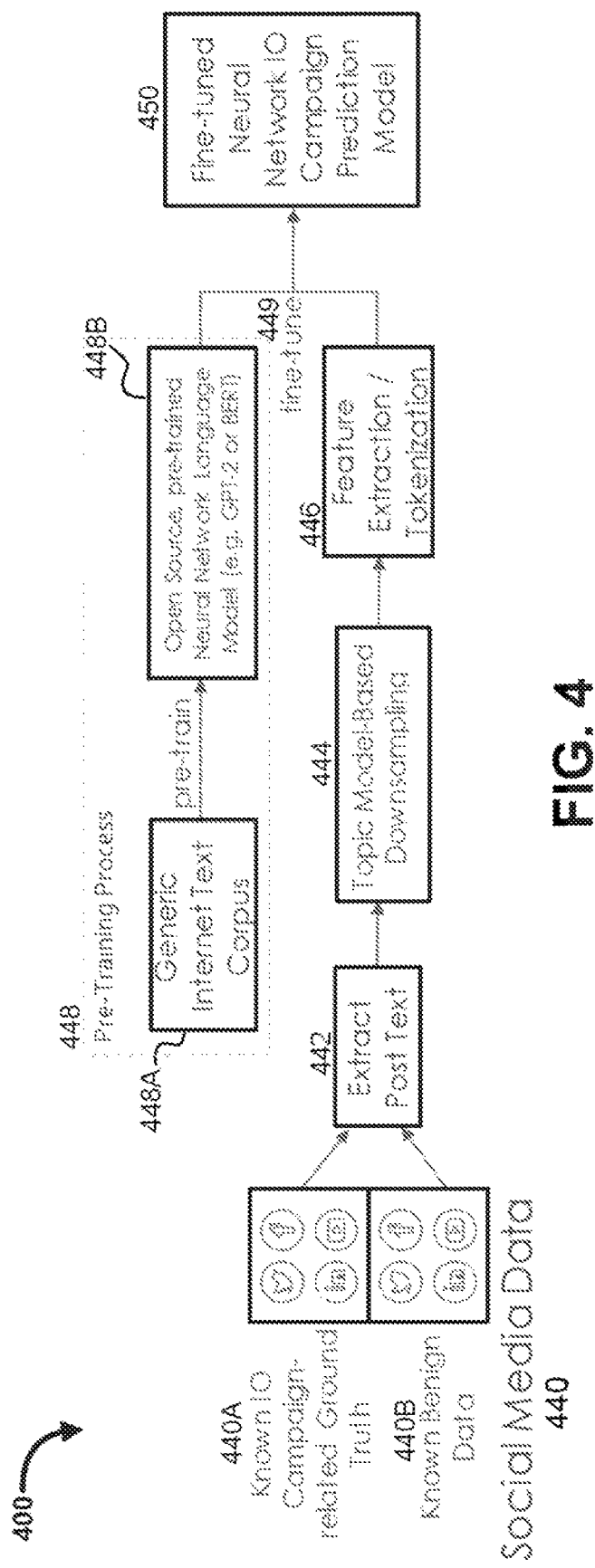
FIG. 4 is a block diagram showing a transfer learning based model generation method, according to an embodiment.

FIG. 4 is a block diagram showing a transfer learning based model generation method 400, according to an embodiment. The method 400 can be performed, for example, during a "pre-production phase" (also referred to herein as a "training phase" or "research phase"), and prior to a "production phase" (discussed below, with reference to FIG. 4). The "pipeline" of activities shown in block diagram 400 can be specific to a particular IO campaign or a particular category of IO campaigns, and thus multiple block diagrams 400 may be generated, each for a different IO campaign or category of IO campaign from multiple IO campaigns (e.g., 2016 U.S. election disinformation campaign, 2019-2020 Hong Kong protest campaign, etc.). As shown in FIG. 4, social media data is received, generated and/or compiled at 440. The social media data 440 includes known IO campaign-related ground truth data 440A and known benign data 440B (collectively referred to herein as "post data"). The known IO campaign-related ground truth data 440A can include open source data and/or closed source data (the latter referring, for example, to analyst-generated data, optionally labeled to indicate an IO-related classification). In some embodiments, the social media data 440 includes proprietary content (e.g., non-public or publicly available) and/or a proprietary data set collected from a plurality of social media platforms. The known IO campaign-related ground truth data 440A can originate from one or more social media platforms and/or data aggregators (e.g., open source data aggregators), and can include ground truth data associated with one or more IO campaigns. Ground truth data is data that has been determined to be factually accurate by a trusted party—e.g., a social media platform (for example, Twitter, etc.) and/or a third party service (e.g., information analyst service, etc.). Portrayal of ground truth in a way that is not accurate or authentic is referred to by many names (e.g., spin, propaganda, puffery, hype, build-up, misinformation, disinformation, indoctrination, half-truths, etc.), not all of which hold a negative connotation depending on point of view and context; however, for convenience, such portrayals may be designated herein as "threats." Moreover, when perpetrated by political, military, or state-backed influencers, IO campaigns may represent security threats, and occasionally are accompanied by actual cyber-intrusions. For that reason, disseminated information regarding detected IO campaigns are referred to herein, again for convenience in terminology, as "threat warnings" or "threat reports".

Ground truth data may be represented in the training data (i.e. social media posts) according to a set of associated labels. The IO campaign-related ground truth data 440A can include social media posts determined to be (and labeled as being) associated with an IO campaign. The IO campaign-related ground truth data 440A can be released by a social media platform and/or by a third-party service (e.g., a cyber-intelligence service) engaged in IO activity detection. The known benign data 440B includes data associated with one or more social media posts from the post data that is known not to be associated with the one or more IO campaigns of interest. The IO campaign-related ground truth data 440A and/or known benign data 440B can include data that is streamed/ingested in real time.

At 442, text is extracted from the post data, and the extracted text is optionally evaluated, at 444, to identify a subset of the post data belonging to one or more IO campaigns of interest (e.g., the 2016 U.S. election disinformation campaign) and/or topics or subtopics of interest, through a process called "downsampling." Downsampling can include reducing the volume of the extracted post text, for example to remove the effects of detected bias, skew, or oversampling within the extracted post text. Downsampling can be performed, for example, using one or more topic-specific models (e.g., a language model configured to identify text associated with a specified topic of interest) to identify topics included in a dataset of social media posts associated with an IO campaign, and/or determine if a distribution of topics within an IO campaign is consistent in the dataset, thereby limiting bias (to topics) and skew of the model. When downsampling is employed, an additional verification step (e.g., empirical verification) may also be performed. In some embodiments, the verification can be based, for example, on ground truth data that is known to be accurate, about previously-analyzed social media posts. At 446, features are extracted from the extracted post text (optionally downsampled at 444), and the extracted features are tokenized to produce a set of tokens, as described above.

As also shown in FIG. 4, a pre-trained neural network language model is generated, via a "pre-training" process 448. The pre-training process 448 includes, at 448A, compiling a corpus of generic (e.g., randomly selected, or selected in a manner that is indifferent to the content thereof or its intended task(s)) text, for example Internet text. The neural network language model is trained using the corpus of generic text, at 448B, to produce the pre-trained neural network language model. Examples of such pre-trained neural network language models include, but are not limited to, a pre-trained text-generating model called Generative Pre-Trained Transformer ("GPT-2") available from OpenAI (an artificial intelligence research and deployment company based in San Francisco, California), or another called Bidirectional Encoder Representations from Transformers ("BERT"), an NLP model developed by Google LLC. In some implementations, the pre-training process 448 is performed using one or more compute devices that are different from one or more compute devices that perform steps 440, 442, 444, 446, and/or 449. The pre-training process 448 can be performed in parallel with steps 440, 442, 444, 446, and/or 449, or can overlap in time with steps 440, 442, 444, 446, and/or 449.

At 449, the tokens generated at 446 are used to "fine tune" the pre-trained neural network language model, to produce the fine-tuned neural network IO campaign prediction model 450 (e.g., a "trained neural network language model" 206G in FIG. 2). As used herein, "fine tuning" refers to one or more of training, updating, and retraining, and may include transfer learning. The fine-tuned neural network IO campaign prediction model 450 can then be used to directly predict, in response to an input including social media post data, whether the social media post associated with the social media post data is part of an IO campaign. Although shown and described as being based on a feature extraction based transfer learning process, the method 400 can, alternatively or in addition, include a weight initialization transfer learning process.

In some embodiments, the extracted text generated at 442 (or the downsampled extracted text, if downsampling has been performed at 444) is, itself, used as training data to "fine-tune" (train, update, and/or retrain) one or more machine learning models. In other embodiments, any combination of two or more of: the extracted text, the downsampled extracted text, the known IO campaign-related ground truth data 440A (or a subset thereof), the known benign data 440B (or a subset thereof), and/or the social media posts associated with the post data can be used as training data to train, update, and/or retrain one or more machine learning models.

Figure 5:
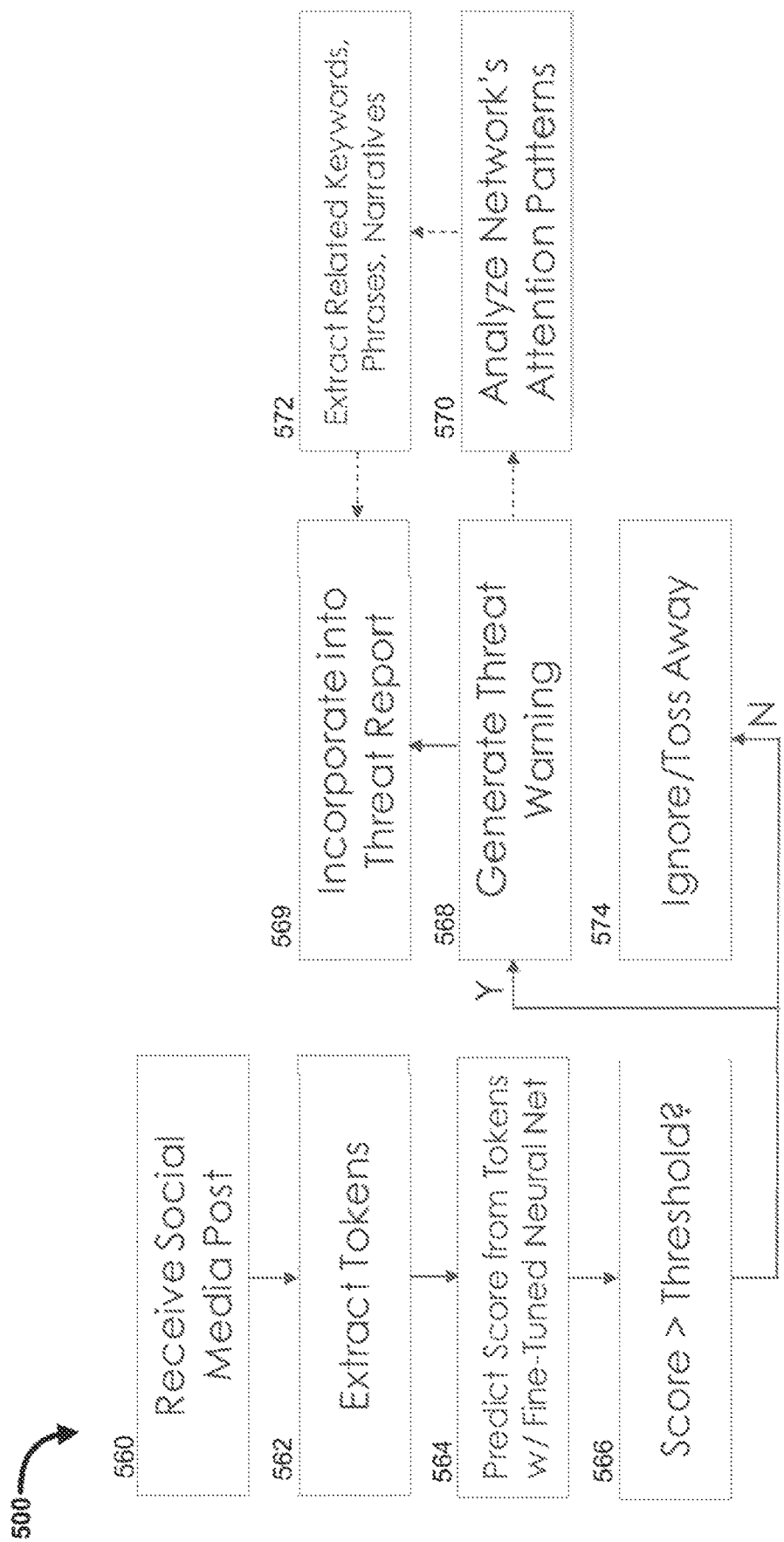
FIG. 5 is a flowchart showing automatic IO campaign detection and analysis, according to an embodiment.

FIG. 5 is a flowchart showing a method 500 for automatic IO campaign detection and analysis, according to an embodiment. The method 500 can be performed, for example, during a "production phase," and after the pre-production phase discussed above, with reference to FIG. 5. As shown in FIG. 5, the method 500 includes, at 560, receiving a social media post for analysis. Tokens are extracted from (or otherwise generated based on) the social media post, at 562. At 564, a fine-tuned neural network language model (e.g., the fine-tuned neural network IO campaign prediction model 450 of FIG. 4 or the trained neural network language model 206G of FIG. 2) is used to predict a score for the social media post, using the tokens generated at 562. The score is compared, at 566, to a threshold value to determine whether the prediction score exceeds the threshold value.

If the prediction score does not exceed the threshold value, the classifier 206P may discard (at 574) or otherwise disregard (e.g., whitelist and/or classify as "benign" or "not IO activity") the social media post. If the prediction score exceeds the threshold value, a threat warning is generated (at 568). The threat warning (optionally in combination with the social media post, the extracted tokens and/or data associated with the social media post) are incorporated into a threat report at 569. The threat report generated at 569 may further include additional context comprising cybersecurity intelligence associated with the social media post. In some embodiments, the cybersecurity intelligence may be used to weight a prediction score to exceed a threshold value. In some embodiments, a second threshold value may be related to the prediction score (e.g., by the classifier 206P) whereby cybersecurity intelligence associated with a social media post not exceeding the first threshold but exceeding the second threshold is determined to warrant the generation of a threat warning at 568. Optionally, the generation of a threat warning at 568 triggers an analysis of a network's attention patterns at 570, and an extraction (and optional storage), at 572, of keywords, phrases and/or narratives from the social media post. The keywords, phrases and/or narratives can also be incorporated, at 569, into the threat report. Alternatively, or in addition, the keywords, phrases and/or narratives can be made accessible to and/or sent to a user (e.g., an analysts) for manual review. In some embodiments, a particular combination of the keywords, phrases and/or narratives serves as a "fingerprint" or "signature" of at least one IO campaign, or of IO activity. Such fingerprints/signatures can be identified, compiled/generated, and used, for example, to predict the "scope" of a particular IO campaign, or how widespread a particular IO campaign is (e.g., by filtering a group/set of received/collected social media posts based on the keywords, phrases and/or narratives of the fingerprint/signature). The IO campaign signature may be used to retroactively determine if similar IO campaigns occurred, by applying the IO campaign signature to past social media posts. The IO campaign signature may also be used to determine the scope of an IO campaign by pivoting between the accounts associated with a matched social media post signature to conduct proactive threat hunting to determine the scope. Associated accounts may be determined according to the neural language model identifying shared lexical patterns and common narratives.

The scope of a particular IO campaign can be determined based on, for example, one or more of: a country associated with an original version of one or more social media posts, a country in which the one or more social media posts were originally distributed, countries in which the social media post(s) have been viewed and/or interacted with, a number of posts or reposts associated with the social media post(s), a number of authors of the social media post(s), a number of social media platforms used to post and repost the social media post(s) (e.g., Twitter, LinkedIn, Facebook, Instagram, etc.), a number of replies to the social media post(s), a time period beginning at a time of the original posting of the social media post(s) and a most recent posting/reposting of the social media post(s), etc. The foregoing properties can be used to define an aggregate scope for the IO campaign (e.g., small, medium or large; local, regional, or global; green, yellow, or red, etc.). In some embodiments, a given signature/fingerprint can be associated with a particular nation state's APT, for example by storing an association between the signature/fingerprint and the APT in memory.

In some embodiments, a non-transitory processor-readable storage medium stores processor-executable instructions to receive social media post data associated with a social media post, and extract a set of features (e.g., including at least one string) from the social media post data. The medium also stores processor-executable instructions to tokenize the set of features, to produce at least one token, and send a representation of the at least one token to a neural network language model for generation of a prediction score for the at least one token. The at least one token can include at least one of (or any combination of): an integer, a non-integer, a binary value, a hexadecimal value, or an alphanumeric character. The neural network language model can be configured to generate the prediction score using, for example, a neural attention mechanism. The tokenizing can include mapping the at least one string to an integer value. The medium also stores processor-executable instructions to generate a threat warning including a representation associated with at least one of the social media post or an account associated with the social media post if the prediction score exceeds a threshold value, and to generate a threat report for presentation to a data analyst, the threat report including the representation associated with the at least one of the social media post or the account associated with the social media post if the prediction score exceeds a threshold value.

In some embodiments, the non-transitory processor-readable storage medium also stores processor-executable instructions to receive a classification for the social media post from the neural network language model, and to include a representation of the classification in the threat report. The classification can have a value within a range of 0 to 1.

In some embodiments, the non-transitory processor-readable storage medium also stores processor-executable instructions to assign a classification to the social media post, and includes a representation of the classification in the threat report. The classification can be based on a multidimensional representation including a value of a maliciousness metric and a value of an authenticity metric.

In some embodiments, the non-transitory processor-readable storage medium also stores processor-executable instructions to receive, from the neural network language model, a classification for the social media post that includes a representation of an IO campaign.

In some embodiments, the instructions to tokenize the set of features include instructions to partition the social media post data into a set of data partitions based on pre-defined locations within the social media post data, and associate each data partition from the set of data partitions with an integer value. The instructions to generate the prediction score for the at least one token can include instructions to send the integer values to the neural network language model.

In some embodiments, the non-transitory processor-readable storage medium also stores processor-executable instructions to access the neural network language model from a model store.

In some embodiments, the non-transitory processor-readable storage medium also stores processor-executable instructions to determine a scope of an IO campaign based on at least one of the social media post data or the prediction score.

In some embodiments, an online repository is used for the generation of a campaign-specific neural network language model using transfer learning, where the "campaign" of interest is defined by a user. For example, the user (e.g., a remote user, and via a remote compute device) may send a set of social media posts to the online repository that the user (or a compute device of the user) has deemed to be associated with the user-defined campaign. The user-defined campaign may be, but is not limited to, an IO campaign. The set of social media posts can be used to retrain a pre-trained neural network language model, via transfer learning, thereby producing a custom neural network language model that is configured to target social media posts associated with the user-defined campaign.

In some embodiments, an online repository is used for dynamic reprogramming of an existing IO-specific neural network language model, the existing IO-specific neural network language model being associated with an IO campaign of interest. For example, a user (e.g., a remote user, and via a remote compute device) or a remote compute device may send a set of social media posts believed (e.g., predicted or known) or suspected to be associated with the IO campaign of interest to the online repository. The sending of the set of social media posts may occur iteratively, for example according to a predefined (e.g., user-defined) delivery schedule and/or in response to detecting that a threshold number (e.g., matching a predefined set size) of new social media posts have been compiled at the remote compute device. In response to receiving the set of social media posts at the online repository, the existing IO-specific neural network language model can be retrained, via transfer learning and using the set of social media posts, to produce an updated IO-specific neural network language model (i.e., an "update process"). The update process can be performed in a recurring manner, e.g., each time a new set of social media posts is received at the online repository, or according to a predefined schedule. Each completion of an update process can trigger delivery of the latest updated IO-specific neural network language model to the remote compute device, and/or can trigger delivery of a notification to the compute device of the user, to advise the user of the availability of the latest updated IO-specific neural network language model. Alternatively, delivery of updates can occur according to a predefined (e.g., a user-defined) schedule.

In some embodiments, a method for detecting an IO campaign includes retrieving, via a processor, a first neural network language model including a natural language model trained on a first dataset, and transforming the first neural network language model based on a set of features associated with a second dataset, to generate a prediction model. The prediction model is configured to generate a prediction based on data associated with a social media post, to classify the social media post based on the prediction, and to issue a threat report (e.g., including cybersecurity intelligence data associated with the social media post and/or extrinsic intelligence associated with the social media post) based on the classification. The issuing of the threat report can also be based on the prediction not exceeding a first threshold value, and optionally further based on the prediction exceeding a second threshold value.

In some embodiments, the second dataset is a target-specific dataset associated with an IO campaign, and the transforming the first neural network language model to generate the prediction model includes transferring features from the first neural network language model to the second dataset.

In some embodiments, the second dataset is a target-specific dataset associated with an IO campaign, and the prediction model is further configured to identify an IO signature based on the social media post, and to determine a scope of the IO campaign based on the IO signature.

In some embodiments, the second dataset is a target-specific dataset associated with a first IO campaign, and the prediction model is further configured to identify an IO signature based on the social media post, and to determine whether a second IO campaign, similar to the first IO campaign, has previously occurred, based on the IO signature.

In some embodiments, a non-transitory processor-readable storage medium stores processor-executable instructions to receive social media post data associated with a social media post, and to extract a plurality of features from the social media post data. The non-transitory processor-readable storage medium also stores processor-executable instructions to tokenize the plurality of features to produce at least one token, and send a representation of the at least one token to a neural network language model for generation of a prediction score for the at least one token. The non-transitory processor-readable storage medium also stores processor-executable instructions to performing the following, if the prediction score exceeds a threshold value: generate a threat warning including a representation associated with at least one of the social media post or an account associated with the social media post, receive, from the neural network language model, a classification for the social media post, the classification having a value within a range of 0 to 1, and generate a threat report for presentation to a data analyst, the threat report including the representation associated with the at least one of the social media post or the account associated with the social media post and a representation of the classification.

In some embodiments, a method for detecting an IO campaign includes retrieving, via a processor, a first neural network language model including a natural language model trained on a first dataset, and modifying the first neural network language model, via transfer learning and based on a second dataset, to produce a second neural network language model. The method also includes receiving, via the processor, social media post data associated with a social media post, and extracting, via the processor, a plurality of features from the social media post data. The processor tokenizes the plurality of features to produce at least one token including a value. The tokenizing includes partitioning the social media post data into a plurality of data partitions based on pre-defined locations within the social media post data, and associating each data partition from the plurality of data partitions with a value. The method also includes generating, using the second neural network language model, a prediction score for the at least one token, the generating including sending the values to the trained neural network language model. If the prediction score exceeds a threshold value, the processor generates a threat warning including a representation associated with at least one of the social media post or an account associated with the social media post.

In some embodiments, a system includes a processor and a memory operably coupled to the processor. The memory stores instructions that, when executed by the processor, cause the processor to receive social media post data associated with a social media post, and to generate a plurality of data values based on the social media post data. The plurality of data values is suitable for use as inputs to a neural network language model. The memory also stores instructions that, when executed by the processor, cause the processor to send a representation of the plurality of data values to the neural network language model for generation of a prediction score for the plurality of data values. If the prediction score exceeds a threshold value, the processor generates a threat warning including a representation associated with at least one of the social media post or an account associated with the social media post, receives a classification from the neural network language model for the social media post (the classification having a value, for example, within a range of 0 to 1), and generates a threat report for presentation to a data analyst. The threat report includes the representation associated with the at least one of the social media post or the account associated with the social media post, and a representation of the classification for the social media post.

In some embodiments, a non-transitory processor-readable storage medium stores processor-executable instructions to receive social media post data associated with a social media post and to extract a plurality of features from the social media post data. The non-transitory processor-readable storage medium also stores processor-executable instructions to tokenize the plurality of features to produce at least one token, and to send a representation of the at least one token to a neural network language model (e.g., accessible from a model store) for generation of a prediction score for the at least one token. If the prediction score exceeds a threshold value, a threat warning is generated that includes a representation associated with at least one of the social media post or an account associated with the social media post, and a threat report is generated for presentation to a data analyst, the threat report including the representation associated with the at least one of the social media post or the account associated with the social media post.

In some embodiments, a system includes a processor and a memory operably coupled to the processor. The memory stores instructions that, when executed by the processor, cause the processor to receive social media post data associated with a social media post, and to generate a plurality of data values based on the social media post data. The plurality of data values is suitable for use as inputs to a neural network language model. Generating the plurality of data values includes partitioning the social media post data into a plurality of data partitions based on pre-defined locations within the social media post data, and associating each data partition from the plurality of data partitions with a value, to produce the plurality of data values. The memory also stores instructions that, when executed by the processor, cause the processor to send a representation of the plurality of data values to the neural network language model for generation of a prediction score for the plurality of data values and, if the prediction score exceeds a threshold value: (1) generate a threat warning including a representation associated with at least one of the social media post or an account associated with the social media post, and (2) generate a threat report for presentation to a data analyst, the threat report including the representation associated with the at least one of the social media post or the account associated with the social media post.

In some embodiments, a system includes a processor and a memory operably coupled to the processor. The memory stores instructions that, when executed by the processor, cause the processor to receive social media post data associated with a social media post, and to generate a plurality of data values based on the social media post data. The plurality of data values is suitable for use as inputs to a neural network language model. The memory also stores instructions that, when executed by the processor, cause the processor to send a representation of the plurality of data values to the neural network language model for generation of a prediction score for the plurality of data values, and to determine a scope of an information operations campaign based on at least one of the social media post data or the prediction score. If the prediction score exceeds a threshold value, a threat warning and a threat report (for presentation to a data analyst) are generated. The threat warning includes a representation associated with at least one of the social media post or an account associated with the social media post, and the threat report includes the representation associated with the at least one of the social media post or the account associated with the social media post.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, and solid state storage devices; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The invention claimed is:

1. A non-transitory processor-readable storage medium storing processor-executable instructions to:
   receive social media post data associated with a social media post; extract a plurality of features from the social media post data;
   tokenize the plurality of features to produce at least one token;
   send a representation of the at least one token to a neural network language model for generation of a prediction score for the at least one token;
   if the prediction score exceeds a threshold value:
      generate a threat warning including a representation associated with at least one of the social media post or an account associated with the social media post, and
      generate a threat report for presentation to a data analyst, the threat report including the representation associated with the at least one of the social media post or the account associated with the social media post;
   assign a classification to the social media post, the classification being based on a multidimensional representation including a value of a maliciousness metric and a value of an authenticity metric; and
   include a representation of the classification in the threat report.

2. The non-transitory processor-readable storage medium of claim 1, further storing processor-executable instructions to receive, from the neural network language model, a classification for the social media post that includes a representation of an information operations campaign.

3. The non-transitory processor-readable storage medium of claim 1, wherein the instructions to tokenize the plurality of features include instructions to:
   partition the social media post data into a plurality of data partitions based on pre-defined locations within the social media post data; and
   associate each data partition from the plurality of data partitions with a value, the instructions to generate the prediction score for the at least one token include instructions to send the values to the neural network language model.

4. The non-transitory processor-readable storage medium of claim 1, wherein the neural network language model is configured to generate the prediction score using a neural attention mechanism.

5. The non-transitory processor-readable storage medium of claim 1, further storing processor-executable instructions to determine a scope of an information operations campaign based on at least one of the social media post data or the prediction score.

6. A method, comprising:
   receiving social media post data associated with a social media post; extract a plurality of features from the social media post data;
   tokenizing the plurality of features to produce at least one token;
   sending a representation of the at least one token to a neural network language model for generation of a prediction score for the at least one token;
   if the prediction score exceeds a threshold value:
      generating a threat warning including a representation associated with at least one of the social media post or an account associated with the social media post, and
      generating a threat report for presentation to a data analyst, the threat report including the representation associated with the at least one of the social media post or the account associated with the social media post;
   assigning a classification to the social media post, the classification being based on a multidimensional representation including a value of a maliciousness metric and a value of an authenticity metric; and
   including a representation of the classification in the threat report.

7. The method of claim 6, further comprising:
   receiving, from the neural network language model, a classification for the social media post that includes a representation of an information operations campaign.

8. The method of claim 6, further comprising:
   partitioning the social media post data into a plurality of data partitions based on pre-defined locations within the social media post data;
   associating each data partition from the plurality of data partitions with a value; and
   generating the prediction score for the at least one token include instructions to send the values to the neural network language model.

9. The method of claim 6, wherein the neural network language model is configured to generate the prediction score using a neural attention mechanism.

10. The method of claim 6, further storing processor-executable instructions to determine a scope of an information operations campaign based on at least one of the social media post data or the prediction score.

11. A system, comprising:
a processor; and
a memory operably coupled to the processor, the memory storing instructions that, when executed by the processor, cause the processor to perform operations, the operations comprising:
receiving social media post data associated with a social media post; extract a plurality of features from the social media post data;
tokenizing the plurality of features to produce at least one token;
sending a representation of the at least one token to a neural network language model for generation of a prediction score for the at least one token;
if the prediction score exceeds a threshold value:
  generating a threat warning including a representation associated with at least one of the social media post or an account associated with the social media post, and
  generating a threat report for presentation to a data analyst, the threat report including the representation associated with the at least one of the social media post or the account associated with the social media post;
  assigning a classification to the social media post, the classification being based on a multidimensional representation including a value of a maliciousness metric and a value of an authenticity metric; and
  including a representation of the classification in the threat report.

12. The system of claim 11, further comprising:
receiving, from the neural network language model, a classification for the social media post that includes a representation of an information operations campaign.

13. The system of claim 11, further comprising:
partitioning the social media post data into a plurality of data partitions based on pre-defined locations within the social media post data; and
associating each data partition from the plurality of data partitions with a value, the instructions to generate the prediction score for the at least one token include instructions to send the values to the neural network language model.

14. The system of claim 11, wherein the neural network language model is configured to generate the prediction score using a neural attention mechanism.

15. The system of claim 11, further storing processor-executable instructions to determine a scope of an information operations campaign based on at least one of the social media post data or the prediction score.

* * * * *